(12) United States Patent
Kimberg et al.

(10) Patent No.: US 10,096,008 B2
(45) Date of Patent: Oct. 9, 2018

(54) METHODS AND SYSTEMS FOR PROCESSING ELECTRONIC DISBURSEMENTS

(75) Inventors: Deborah Kimberg, Chesterfield, MO (US); Shawn Hagmeier, St. Peters, MO (US); Brian DuCharme, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 13/608,322

(22) Filed: Sep. 10, 2012

(65) Prior Publication Data
US 2014/0074705 A1  Mar. 13, 2014

(51) Int. Cl.
*G06Q 20/10* (2012.01)
*G06Q 20/36* (2012.01)
*G06Q 40/08* (2012.01)

(52) U.S. Cl.
CPC .......... *G06Q 20/10* (2013.01); *G06Q 20/108* (2013.01); *G06Q 20/36* (2013.01); *G06Q 40/08* (2013.01)

(58) Field of Classification Search
CPC .................................................. G06Q 20/108
USPC .......................................................... 705/42
See application file for complete search history.

(56) References Cited

U.S. PATENT DOCUMENTS

| | | | |
|---|---|---|---|
| 6,208,973 B1 | 3/2001 | Boyer et al. | |
| 7,102,620 B2* | 9/2006 | Harries | G06F 1/1616 345/156 |
| 7,356,505 B2* | 4/2008 | March | 705/39 |
| 7,376,587 B1* | 5/2008 | Neofytides | G06Q 20/02 705/26.35 |

(Continued)

FOREIGN PATENT DOCUMENTS

| | | |
|---|---|---|
| JP | 2009104560 A | 5/1999 |
| KR | 1020030053243 A | 6/2003 |

(Continued)

OTHER PUBLICATIONS

Jenkins, Beth, "Develop Mobile Money Ecosystems", CSR Initiative Harvard Kennedy School 2008 (Year: 2008).*

(Continued)

*Primary Examiner* — Eric T Wong
*Assistant Examiner* — Kevin T Poe
(74) *Attorney, Agent, or Firm* — Armstrong Teasdale LLP

(57) ABSTRACT

A disbursement module (DM) computer device is provided for processing an electronic disbursement. The DM computer device includes a memory device and a processor. The processor is programmed to register a payor with a disbursement service provided by the DM computer device and to receive a disbursement command from the payor. The disbursement command instructs a disbursement to be made to a payee and includes payee contact information, payee verification data, and a disbursement amount. The processor is further programmed to receive a disbursement request (Continued)

message that includes a payee identifier from the payee requesting that the disbursement be made, and to verify the payee by matching the payee identifier to the payee verification data. The processor is further programmed to electronically transfer funds from a bank account associated with the payor to a bank account associated with the payee.

14 Claims, 14 Drawing Sheets

(56) References Cited

U.S. PATENT DOCUMENTS

| | | | |
|---|---|---|---|
| 7,653,597 | B1 | 1/2010 | Stevanovski et al. |
| 7,844,546 | B2 * | 11/2010 | Fleishman ............. G06Q 20/40 705/39 |
| 8,055,519 | B1 | 11/2011 | Trobiani |
| 8,204,766 | B2 | 6/2012 | Bush |
| 8,616,453 | B2 * | 12/2013 | Itwaru ..................... 235/462.01 |
| 2002/0016763 | A1 * | 2/2002 | March ............................. 705/39 |
| 2002/0035488 | A1 | 3/2002 | Aquila et al. |
| 2002/0052841 | A1 * | 5/2002 | Guthrie ................. G06Q 20/04 705/40 |
| 2002/0087344 | A1 | 7/2002 | Billings et al. |
| 2002/0104878 | A1 * | 8/2002 | Seifert et al. ................. 235/379 |
| 2002/0184148 | A1 * | 12/2002 | Kahn et al. ..................... 705/40 |
| 2003/0014004 | A1 | 7/2003 | O'Leary et al. |
| 2004/0019559 | A1 | 1/2004 | Moenickheim et al. |
| 2004/0249750 | A1 * | 12/2004 | Granzer ................. G06Q 20/00 705/40 |
| 2005/0177521 | A1 * | 8/2005 | Crosson Smith ...... G06Q 20/10 705/67 |
| 2006/0212378 | A1 | 9/2006 | Hoffman et al. |
| 2007/0255662 | A1 * | 11/2007 | Tumminaro ......... G06Q 20/027 705/79 |
| 2007/0294168 | A1 * | 12/2007 | King ................................ 705/44 |
| 2008/0126145 | A1 * | 5/2008 | Rackley, III ......... G06Q 20/102 455/406 |
| 2008/0208638 | A1 | 8/2008 | Davidson et al. |
| 2008/0210751 | A1 * | 9/2008 | Kim .............................. 235/379 |
| 2010/0138243 | A1 | 6/2010 | Carroll |
| 2010/0260388 | A1 * | 10/2010 | Garrett ................... G06Q 20/22 382/124 |
| 2011/0238553 | A1 * | 9/2011 | Raj et al. ......................... 705/37 |
| 2012/0035946 | A1 | 2/2012 | Coyne |
| 2012/0191606 | A1 * | 7/2012 | Milne ............................. 705/44 |
| 2012/0203632 | A1 * | 8/2012 | Blum ................. G06Q 30/0255 705/14.53 |
| 2013/0060689 | A1 * | 3/2013 | Oskolkov et al. .............. 705/42 |
| 2014/0108249 | A1 * | 4/2014 | Kulpati et al. .................. 705/44 |

FOREIGN PATENT DOCUMENTS

| | | |
|---|---|---|
| RU | 2165101 C2 | 4/2001 |
| RU | 2231117 C2 | 6/2004 |

OTHER PUBLICATIONS

Leishman, Paul, "Is there Really any Money in Mobile Money?", Oct. 2010, GSMA Mobile Money (Year: 2010).*
Alakoc, Yalin, "Connecting the Global Payments Network", Apr. 2009, Citi Global Transaction Services (Year: 2009).*
ISR/WO dated Dec. 12, 2013 for PCT/US2013/057517 filed Aug. 30, 2013, 11 pages.
Official Action issued by the Patent Office of the Russian Federation, dated Sep. 6, 2017, including an English language translation, for co-pending Russian patent application No. 2015113125.

* cited by examiner

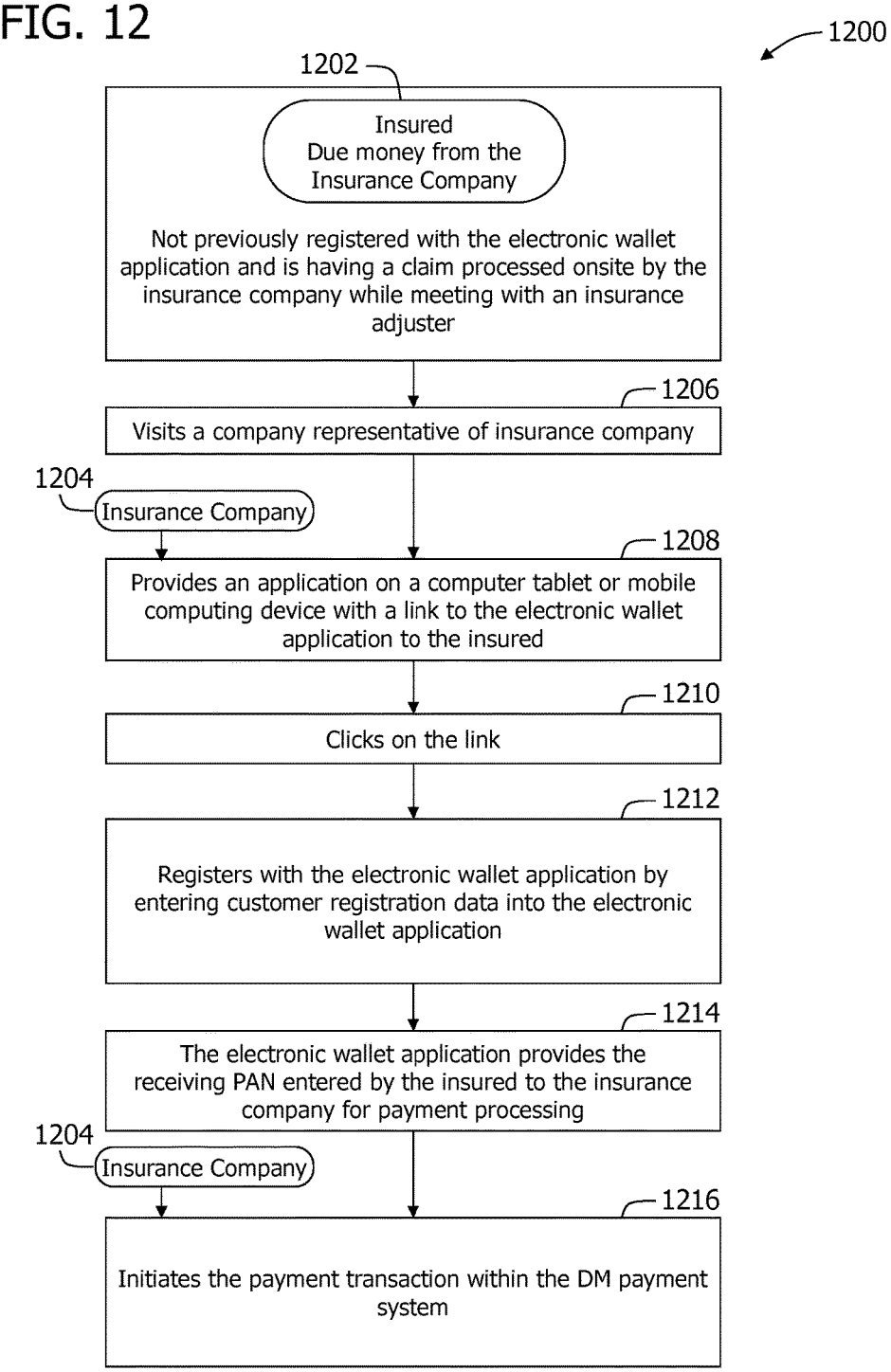

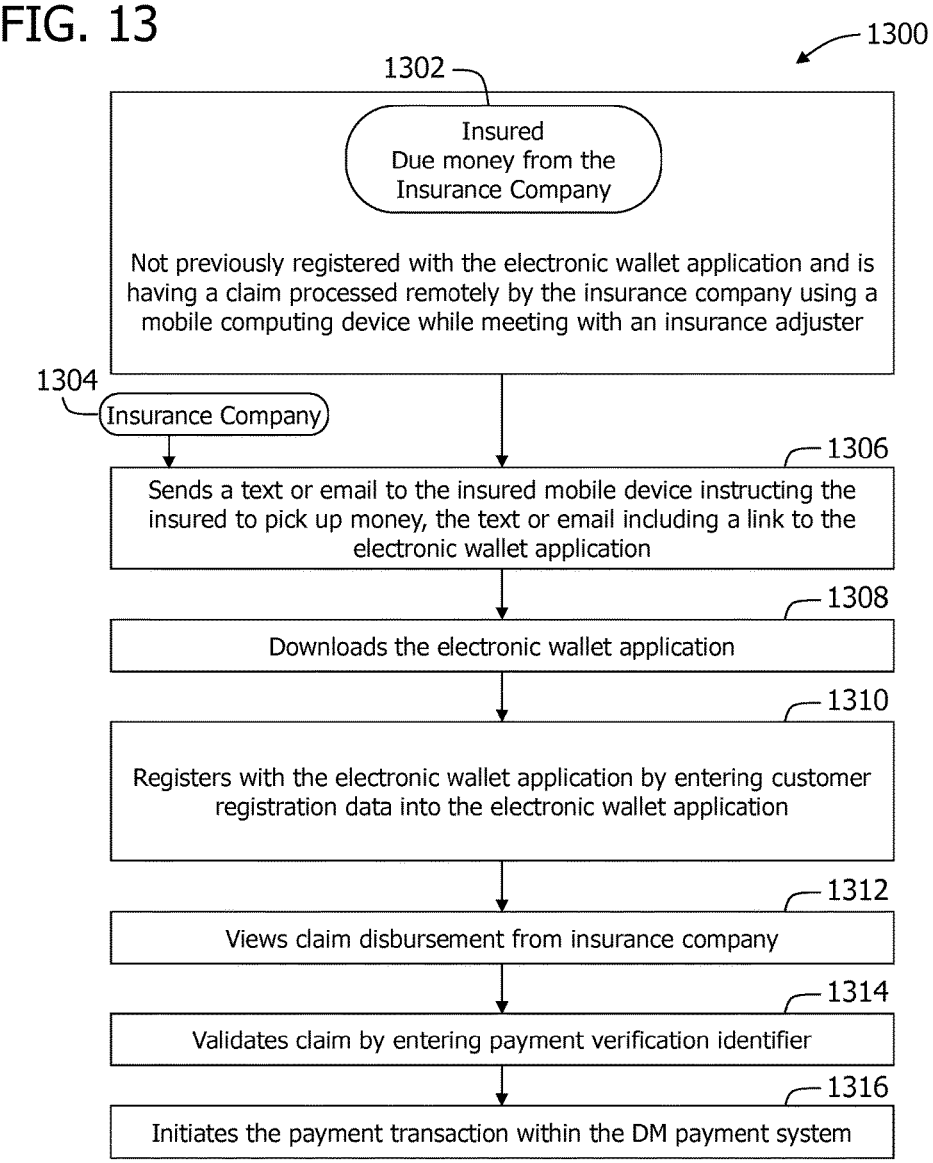

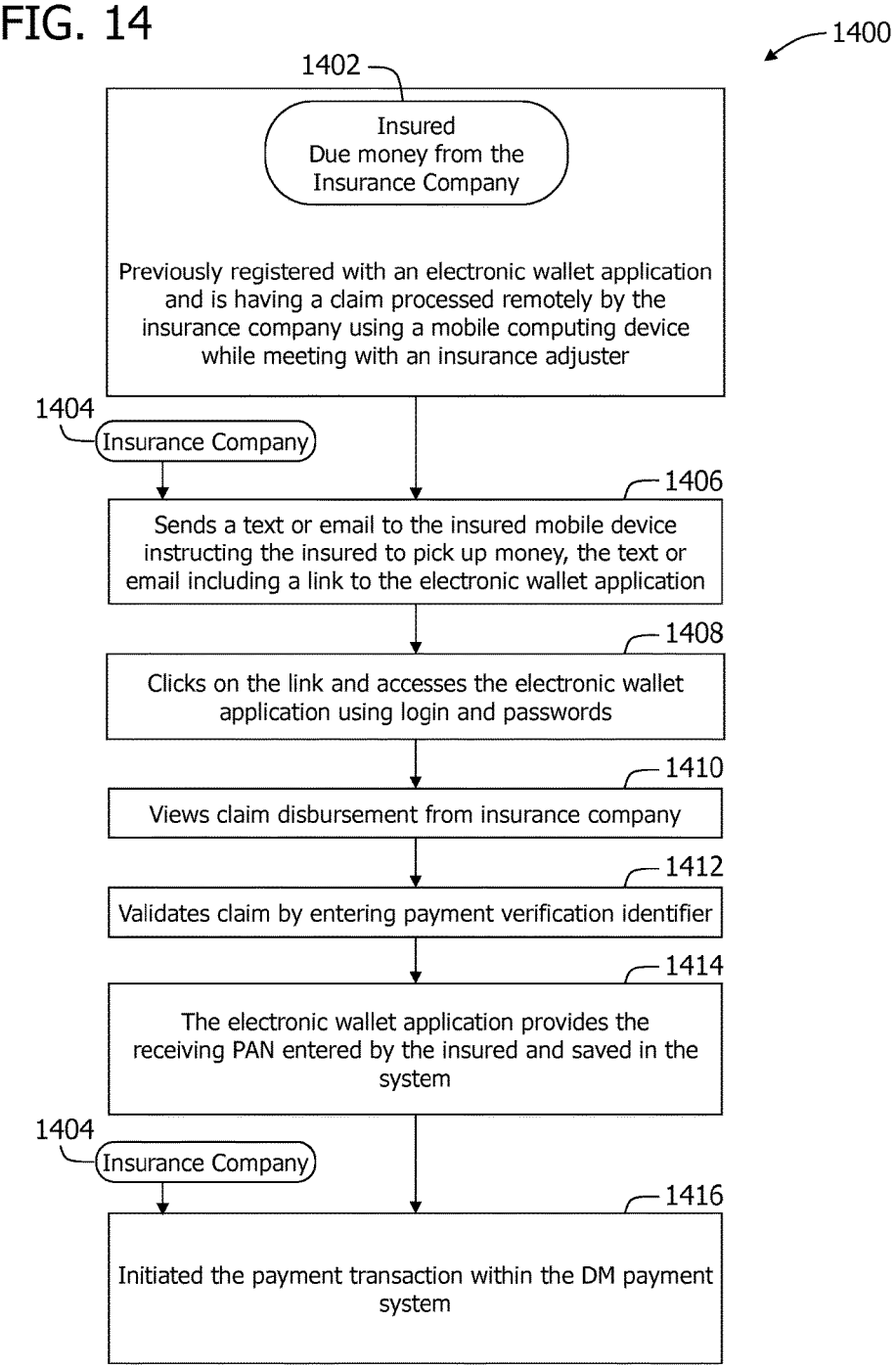

METHODS AND SYSTEMS FOR PROCESSING ELECTRONIC DISBURSEMENTS

BACKGROUND OF THE DISCLOSURE

This invention relates generally to processing electronic disbursements and, more particularly, to network-based methods and systems for processing electronic disbursements over a payment card network for a business entity electronically disbursing funds to a consumer.

In today's business world, there are times when a consumer must make a payment to a merchant or business entity for a purchase of goods or service, but there are also times when a merchant or business entity is required to make a payment to a consumer. Businesses such as insurance companies, governmental entities, and other companies may be required during their normal business operations to make a payment to a consumer.

For example, many insurance companies will issue homeowners insurance policies to consumers. If such a policyholder having an insurance policy issued by Insurance Company A suffers damage to his or her home as a result of a fire, then Insurance Company A may be required to pay funds to the homeowner under that insurance policy. Those funds may include money for temporary living expenses that are needed by the homeowner while the home is being repaired. It may be important that these temporary living expenses funds are paid out quickly to the homeowner so that the homeowner can quickly arrange for living accommodations for himself and his family.

In at least some known situations, Insurance Company A would investigate the claim, submit the claim, process the claim, and issue a paper check to the homeowner for these living expenses. Issuing a paper check in this known situation is both expensive and time consuming.

In fact, it is estimated that today 95% of all businesses (e.g., insurance companies, governmental entities, and other business) making payments to consumers are made by checks that are expensive to manage the printing, replacement, and operations costs. In many cases, there is not a viable alternative solution for making such payments.

Accordingly, a quicker and more efficient process for business to make payments to consumers is needed. A process and system is needed that enables businesses to electronically disburse funds to consumers.

BRIEF DESCRIPTION OF THE DISCLOSURE

In one aspect, a disbursement module (DM) computer device is provided for processing an electronic disbursement. The DM computer device includes a memory device and a processor. The processor is programmed to register a payor with a disbursement service provided by the DM computer device and to receive a disbursement command from the payor. The disbursement command instructs a disbursement to be made to a payee and includes payee contact information, payee verification data, and a disbursement amount. The processor is further programmed to receive a disbursement request message that includes a payee identifier from the payee requesting that the disbursement be made, and to verify the payee by matching the payee identifier to the payee verification data. The processor is further programmed to electronically transfer funds from a bank account associated with the payor to a bank account associated with the payee.

In another aspect, a computer-implemented method is provided for processing an electronic disbursement by a disbursement module (DM) computer device. The DM computer device includes a memory device and a processor. The method includes registering a payor with a disbursement service provided by the DM computer device and communicating a disbursement command from the payor to the disbursement service instructing a disbursement to be made to a payee. The disbursement command includes payee contact information, payee verification data, and a disbursement amount to be paid to the payee. The method further includes receiving a disbursement request message that includes a payee identifier from the payee requesting that the disbursement be made to the payee. The method further includes matching the payee identifier to the payee verification data to verify the payee, and electronically transferring funds from a bank account associated with the payor to a bank account associated with the payee or a payment card for use by the payee.

In another aspect, one or more non-transitory computer-readable storage media having computer-executable instructions embodied thereon is provided for processing an electronic disbursement by a disbursement module (DM) computer device. The DM computer device includes a memory device and a processor. When executed by the processor, the computer-executable instructions cause the processor to register a payor with a disbursement service provided by the DM computer device and to receive a disbursement command from the payor. The disbursement command instructs a disbursement to be made to a payee and includes payee contact information, payee verification data, and a disbursement amount. The processor is further programmed to receive a disbursement request message that includes a payee identifier from the payee requesting that the disbursement be made, and to verify the payee by matching the payee identifier to the payee verification data. The processor is further programmed to electronically transfer funds from a bank account associated with the payor to a bank account associated with the payee.

BRIEF DESCRIPTION OF THE DRAWINGS

FIGS. 1-14 show exemplary embodiments of the method and system described herein.

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary payment card account system having a Disbursement Module (DM) in accordance with one embodiment of the present invention.

FIG. 3 is an expanded block diagram of an exemplary embodiment of a server architecture of the payment card account system shown in FIG. 2.

FIG. 4 illustrates an exemplary configuration of a cardholder computer device operated by a cardholder such as the computer devices shown in FIGS. 2 and 3.

FIG. 5 illustrates an exemplary configuration of a server computer device such as the server system shown in FIGS. 2 and 3.

FIG. 6 is a simplified data flow block diagram of a customer registering within an exemplary DM payment account system to receive a disbursement in accordance with one embodiment of the present invention.

FIG. 7 is a simplified data flow block diagram of a disbursement transaction being processed by a DM payment account system in accordance with one embodiment of the present invention.

FIG. 8 is a flowchart showing a disbursement transaction being processed by a DM payment account system from the perspective of a company newly registering for a disbursement service.

FIG. 9 is a flowchart showing a disbursement transaction being processed by a DM payment account system from the perspective of a customer, who is not previously registered with an electronic wallet application of the DM payment system.

FIG. 10 is a flowchart showing a disbursement transaction being processed by a DM payment account system from the perspective of a customer, who is previously registered with an electronic wallet application of the DM payment system.

FIG. 11 is a flowchart showing a disbursement transaction being processed by a DM payment account system from the perspective of a customer, who is having a claim processed onsite by a business entity and who is not previously registered with an electronic wallet application of the DM payment system.

FIG. 12 is a flowchart showing a disbursement transaction being processed by a DM payment account system from the perspective of a customer, who is having a claim processed onsite while meeting with a customer representative associated with a business entity and who is not previously registered with an electronic wallet application of the DM payment system.

FIG. 13 is a flowchart showing a disbursement transaction being processed by a DM payment account system from the perspective of a customer, who is having a claim processed remotely by a business entity and who is not previously registered with an electronic wallet application of the DM payment system.

FIG. 14 is a flowchart showing a disbursement transaction being processed by a DM payment account system from the perspective of a customer, who is having a claim processed remotely by a business entity and who is previously registered with an electronic wallet application of the DM payment system.

DETAILED DESCRIPTION OF THE DISCLOSURE

Figure 1:
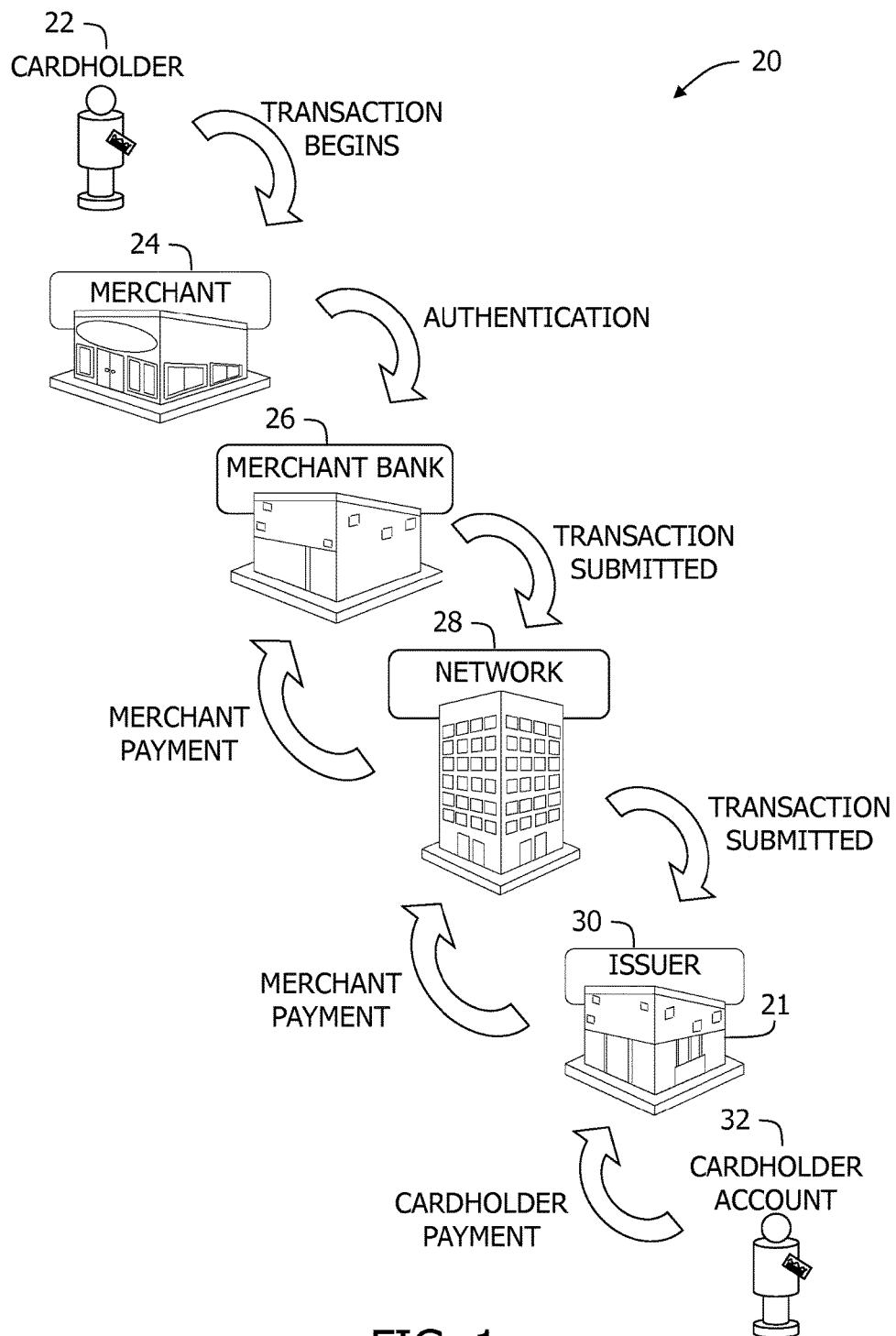

Embodiments of the methods and systems described herein include a payment card account system having a disbursement module (DM) (referred to herein collectively as the "DM payment system") that enables the system to offer a disbursement service to at least one of merchants, cardholders and issuers. In one embodiment, the DM payment system enables a business, such as an insurance company, governmental entity, or other business entity, to register with the DM payment system, and then make electronic payments to its customers (e.g., an insured, a constituent, or other customer). A business or entity making a payment may be referred to as "payor" and the customer or the party receiving the payment may be referred to as "payee".

For example, in the scenario where a business entity is looking to use the DM payment system for making payments (i.e., disbursements) to its customers, the business entity accesses a website associated with the payment card interchange network. The business entity registers with the payment card network for the DM service by entering payor registration data. After the business entity registers for the DM service, the business entity downloads certain computer code from the payment card network to a business entity computer device for displaying a disbursement button on a website associated with the business entity. As explained below in more detail, the disbursement button is displayed on the business entity website so that a customer representative of the business entity can initiate a disbursement to a customer.

Continuing with the example from above, after the business entity has registered for the DM service and the disbursement button has been downloaded onto the business entity website, a customer representative associated with the business entity may prepare an internal form for processing and making a disbursement to a customer. In the example embodiment, the internal form is displayed on the business entity computer device and accessible by the customer representative. For example, the business entity could be an insurance company that must make a disbursement to a policyholder for a claim. In that case, the customer representative logs into the insurance company computing system, accesses a claim disbursement form online, enters the required information into the disbursement form including capturing the customer (i.e., policyholder) contact information such as a mobile phone number and/or email address for the customer, and selects the DM disbursement button displayed on the insurance company website. The customer contact information and an optional payment verification identifier (i.e., claim ID) are then communicated as a disbursement command from the insurance company computing system to the DM payment system for processing. If a claim ID is generated, the claim ID is provided to the customer in an email or by other means to be used as a validation for payment.

In another embodiment, the disbursements can be uploaded as a batch file. In the case of a batch disbursement, a customer representative for the business entity prepares the online internal forms to make the disbursements, and selects the DM disbursement button displayed on the business entity website. At a designated time (i.e., daily, weekly, etc.), the disbursement commands are transmitted, typically in an XML format, to the DM payment system for processing. Each disbursement command of the batch disbursement commands contains a contact email or mobile phone number for the customer/payee. In some cases, the disbursement command transmitted to the DM payment system also includes a claim ID for customer validation. If there is a claim ID, the claim ID is provided to the customer/payee in an email or by other means (payment verification message) so that it can be used by the customer to validate payment.

It is important to note that at this point the customer or payee does not need to be signed up for receiving an electronic disbursement. In other words, the insurance company representative can prepare the disbursement form online, enter the required information into the disbursement form including capturing the customer (i.e., policyholder) contact information such as a mobile phone number and/or email address for the customer, and select the DM disbursement button displayed on the insurance company website without the customer being registered within the system for receiving payment.

After the company has uploaded the disbursement commands into the DM payment system including a contact email or mobile phone number for the customer, and an amount ($X) to be paid to the customer, a payment verification message is automatically sent to the customer via the customer contact data (email, text message, push alert). The payment verification message may also include a link to the insurance company website. Accordingly, the customer accesses the website of the insurance company based on the commands in the payment message, and then validates the claim number with the claim ID. The website includes a link for the customer to register with the DM payment system. In the example embodiment, the DM payment system would include a payment processing application, sometimes referred to as an electronic wallet application that the customer would register with by entering customer registration data including a receiving PAN (Primary Account Number) or bank account numbers along with any payment PANs or bank account numbers. If the customer does not have an eligible account, the customer will be prompted to register for a prepaid card associated with the DM payment system.

In the example embodiment, the wallet application provides the receiving PAN entered by the customer to the business entity (i.e., the insurance company) for payment processing. The payment processing can utilize a payment system such as MasterCard® MoneySend™ (MasterCard and MoneySend are trademarks of MasterCard International Incorporated located in Purchase, N.Y.), an Automated Clearing House (ACH) account, or any other payment processing account. The company then initiates the payment transaction within the DM payment system, and the customer receives an electronic payment either by the funds being transferred to the customer receiving PAN, the customer bank account, or a retail location for customer pickup, or being transferred to a prepaid credit card that the customer can use.

Accordingly, the DM payment system enables a user, such a business entity, to electronically disburse funds to a customer using an electronic wallet computer application and the payment card system, wherein the funds are transferred over the payment network from an account associated with the business entity to an account or a prepaid payment card associated with the customer. The DM payment system enables a business entity to quickly make a payment to the customer without incurring the costs associated with issuing a check.

The methods and systems described herein may be implemented using computer programming or engineering techniques including computer software, firmware, hardware or any combination or subset thereof, wherein the technical effect may include at least one of: (i) the company accesses a website associated with the payment card interchange network, the website including an electronic wallet application; (ii) the company registers with the electronic wallet application by entering payor registration data; (iii) company downloads a disbursement button from the payment card network for display on the company website or tablet application; (iv) a customer representative associated with the company prepares an internal form for processing and making a disbursement to the customer including capturing the customer contact information such as a mobile phone number and/or email address; (v) the company representative selects the DM disbursement button displayed on the company website; (vi) a message is communicated to the customer per the customer contact information advising the customer that a payment is ready, wherein the message may include a link to the company website and a payment verification identifier (i.e., claim ID); (vii) the customer accesses the company website per the message and verifies the claim by entering the claim ID; (viii) the customer clicks on a link to the electronic wallet application and registers therewith if not already registered, wherein the customer provides customer registration data including customer contact data, a receiving PAN (Primary Account Number) or bank account numbers, any payment PANs or bank account numbers for the customer, and/or (optionally) register for a prepaid card; (ix) the company receives the customer registration data through the electronic wallet application; (x) the company initiates the disbursement transaction by instructing the issuer bank to disburse the funds to customer through the payment card interchange network; and (xi) the payment card network performs an authorization process and settlement process to electronically transfer the funds from the company to the customer.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of validating cardholder information through the payment card network for merchants in a payment card network. However, it is contemplated that this disclosure has general application to computing systems in industrial, commercial, and residential applications.

Although the DM payment system may be described herein in the context of use by an insurance company, it is not limited to this particular use. Accordingly, the DM payment system may be used in other embodiments, including any other entity making payments or disbursements to its customers.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention described herein relate to validating cardholder information through the payment card network for merchants in payment card transactions, such as, card-not-present payment card transactions.

FIG. 1 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® payment system. The MasterCard® payment system is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution such as an issuer 21 issues a payment account card, such as a credit card account or a debit card account, to a cardholder 22, who uses the payment account card to tender payment for a purchase from a merchant 24. To accept payment with the payment account card, merchant 24 must normally establish an account with a financial institution that is part of the financial payment system. This financial institution is usually called the "merchant bank" or the "acquiring bank" or "acquirer bank." When a cardholder 22 tenders payment for a purchase with a payment account card (also known as a financial transaction card), merchant 24 requests authorization from merchant bank 26 for the amount of the purchase. The request may be performed over the telephone, but is usually performed through the use of a point-of-sale terminal, which reads the cardholder's account information from the magnetic stripe on the payment account card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor" or an "acquiring processor."

Using a network interface processor 28, the computers of the merchant bank or the merchant processor will communicate with the computers of issuer 30 to determine whether the cardholder's account is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-sale terminal. If a cardholder cancels a transaction before it is captured, a "void" is generated. If a cardholder returns goods after the transaction has been captured, a "credit" is generated.

For debit card transactions, when a request for a PIN authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, merchant bank 26, and issuer 30. Settlement refers to the transfer of financial data or funds between the merchant's account, merchant bank 26, and issuer 30 related to the transaction. Usually, transactions are captured and accumulated into a "batch," which is settled as a group.

Financial transaction cards or payment account cards can refer to credit cards, debit cards, and prepaid cards. These cards can all be used as a method of payment for performing a transaction. As described herein, the term "financial transaction card" or "payment account card" includes cards such as credit cards, debit cards, and prepaid cards, but also includes any other devices that may hold payment account information, such as mobile phones, personal digital assistants (PDAs), and key fobs.

Figure 2:
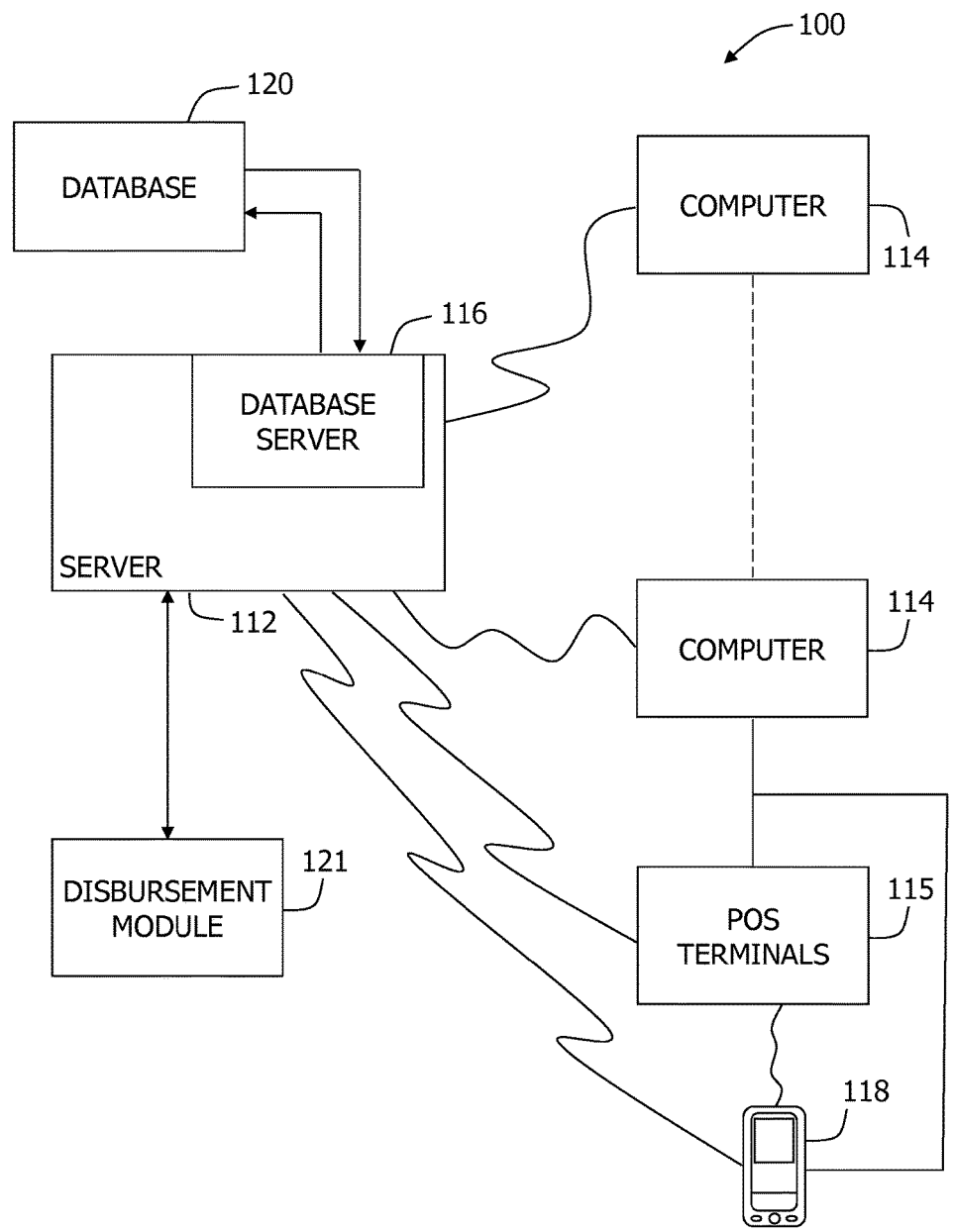

FIG. 2 is a simplified block diagram of an exemplary payment card account system 100 having a Disbursement Module (DM) and offering a disbursement service in accordance with one embodiment of the present invention. System 100 is a payment card account system, which can be utilized by account holders as part of a process of initiating an authorization request and performing a transaction as described below. In addition, system 100 is a payment card account system having a DM, which enables a first user (e.g., merchant, business entity, etc.) to register with the system and initiate an electronic disbursement payment to a second user (e.g., customer, etc.) as described below. Therefore, payment card system 100 can also be referred to as a DM payment system.

More specifically, in the example embodiment, system 100 includes a server system 112, which is a type of computer system, and a plurality of client sub-systems (also referred to as client systems 114) connected to server system 112. In one embodiment, client systems 114 are computers including a web browser and a memory device, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a cardholder's financial transaction card.

A database server 116 is connected to database 120, which contains information on a variety of matters, as described below in greater detail. In one embodiment, centralized database 120 is stored on server system 112 and can be accessed by cardholders at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store account data including at least one of a cardholder name, a cardholder address, an account number, and other account identifiers. Database 120 may also store merchant data including a merchant identifier that identifies each merchant registered to use the payment account card network, and instructions for settling transactions including merchant bank account information. Database 120 may also store PAN numbers or bank account numbers for various parties including merchants and customers, along with payment verification identifiers and other data necessary to implement the system and processes described herein.

In one embodiment, a Disbursement Module (DM) 121 is in communication with server system 112. DM 121 enables system 100 to offer the disbursement service, which includes enabling a merchant to disburse funds electronically to a customer, and validating that the customer is the appropriate party to receive those funds. Specifically, the merchant uploads disbursement commands to DM 121 including a disbursement amount, customer contact data, and a designated claim ID (or a payment verification ID). The customer registers with an electronic wallet application hosted by server system 112 which includes entering customer registration data including requesting a prepaid payment card or providing a receiving PAN for the customer, and providing a claim ID. The customer can register with the electronic wallet application using one of client systems 114 or input device 118. DM 121 then validates the customer entered claim ID by comparing it to the designated claim ID provided in the disbursement commands. If the claim IDs match, the customer is validated for receiving the disbursement. An authorization process and settlement process for transferring funds from the merchant to the customer are performed. The funds are transferred as requested by the customer either to the customer receiving PAN account or to a prepaid payment card.

System 100 also includes at least one input device 118, which is configured to communicate with at least one of POS terminal 115, client systems 114 and server system 112. In the exemplary embodiment, input device 118 is associated with or controlled by a cardholder making a purchase using a payment card account and payment card account system 100. Input device 118 is interconnected to the Internet through many interfaces including a network, such as a local area network (LAN) or a wide area network (WAN), dial-in-connections, cable modems, wireless modems, and special high-speed ISDN lines. Input device 118 could be any device capable of interconnecting to the Internet including a web-based phone, personal digital assistant (PDA), or other web-based connectable equipment. Input device 118 is configured to communicate with POS terminal 115 using various outputs including, for example, Bluetooth communication, radio frequency communication, near field communication, network-based communication, and the like.

In the example embodiment, one of client systems 114 may be associated with an acquirer, a cardholder, or a customer; while another one of client systems 114 may be associated with an issuer; POS terminal 115 may be associated with a merchant; input device may be associated with a cardholder or a customer; and server system 112 may be associated with the payment system network or the interchange network.

Figure 3:
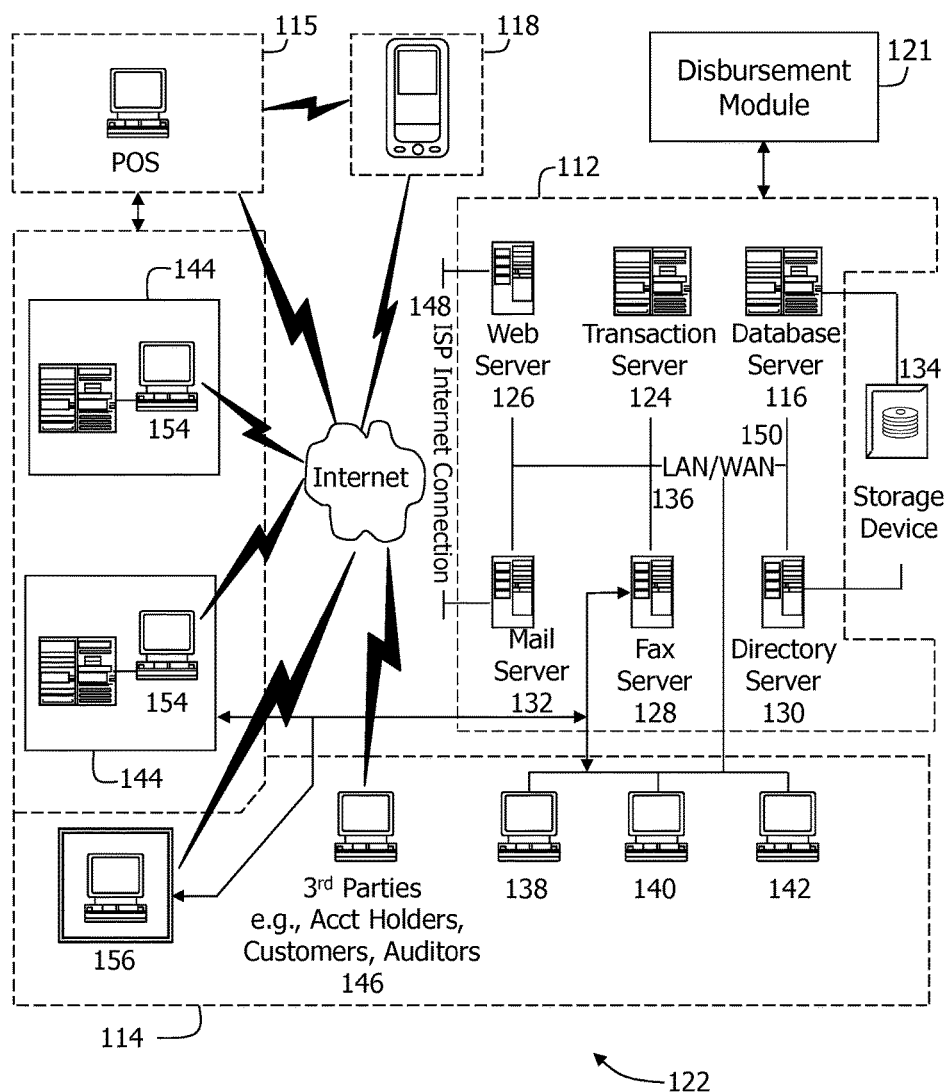

FIG. 3 is an expanded block diagram of an exemplary embodiment of a server architecture of a payment card account system 122 having a Disbursement Module (DM) and offering a disbursement service in accordance with one embodiment of the present invention. Components in system 122, identical to components of system 100 (shown in FIG. 2), are identified in FIG. 3 using the same reference numerals as used in FIG. 2. System 122 includes server system 112, client systems 114, POS terminals 115, and input devices 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a cardholder's workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

In the example embodiment, server system 112 is in communication with DM 121. DM 121 enables system 122 to offer the disbursement service, which includes enabling a merchant to disburse funds electronically to a customer, and validating that the customer is the appropriate party to receive those funds.

Figure 4:
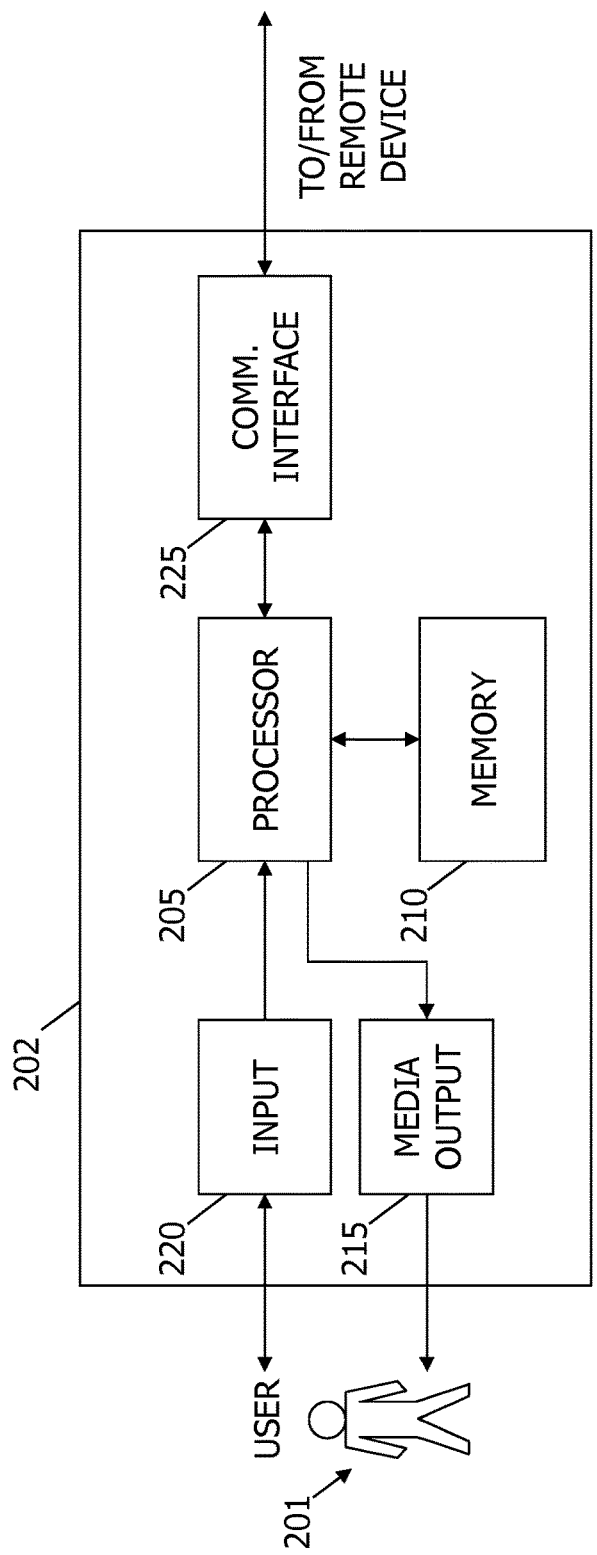

FIG. 4 illustrates an exemplary configuration of a cardholder's' computer device 202 operated by a cardholder's 201. Cardholder's computer device 202 may include, but is not limited to, client systems 114, 138, 140, and 142, POS terminal 115, input device 118, workstation 154, and manager workstation 156 (shown in FIG. 3).

Cardholder's computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

Cardholder's computer device 202 also includes at least one media output component 215 for presenting information to cardholder's 201. Media output component 215 is any component capable of conveying information to cardholder's 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder's computer device 202 includes an input device 220 for receiving input from cardholder's 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Cardholder's computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to cardholder's 201 via media output component 215 and, optionally, receiving and processing input from input device 220. A user interface may include, among other possibilities, a web browser and client application. Web browsers enable cardholder's, such as cardholder's 201, to display and interact with media and other information typically embedded on a web page or a website from server system 112. A client application allows cardholder's 201 to interact with a server application from server system 112.

Figure 5:
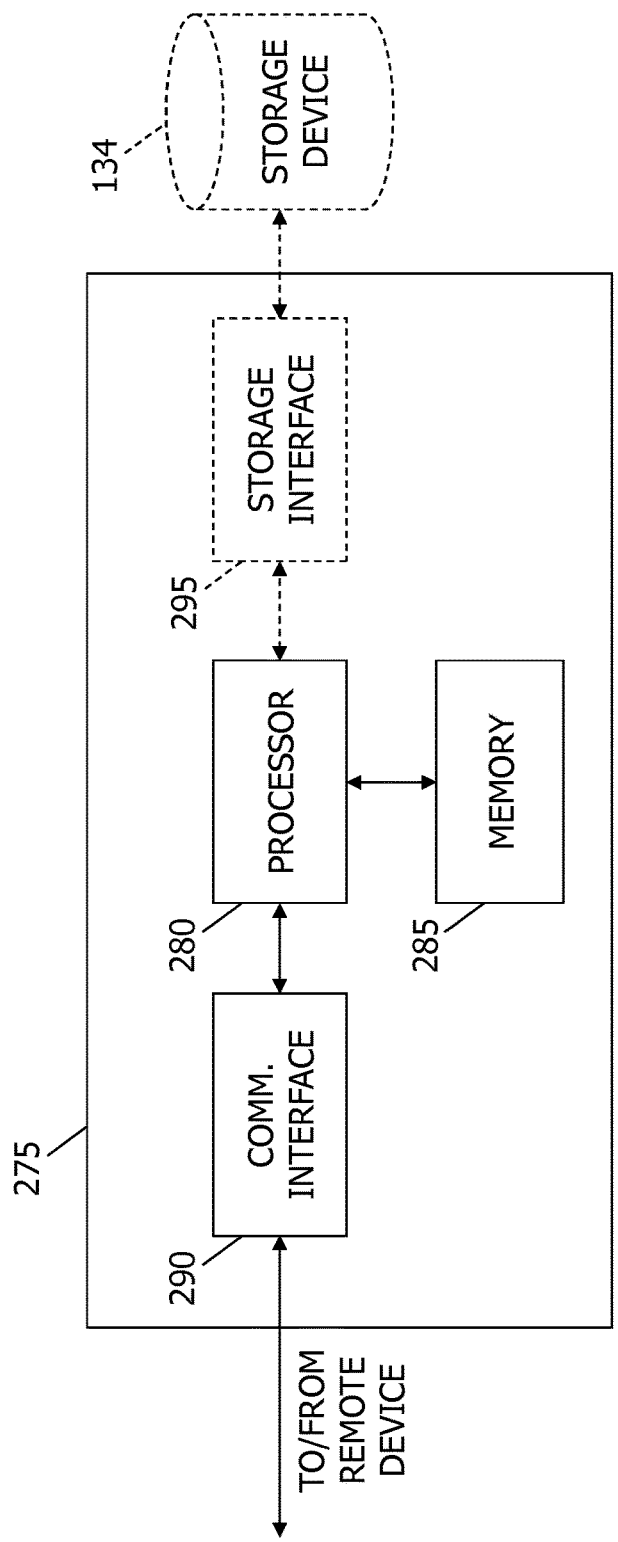

FIG. 5 illustrates an exemplary configuration of a server computer device 275 such as server system 112 (shown in FIGS. 2 and 3). Server computer device 275 may include, but is not limited to, database server 116, transaction server 124, web server 126, fax server 128, directory server 130, and mail server 132.

Server computer device 275 includes a processor 280 for executing instructions. Instructions may be stored in a memory area 285, for example. Processor 280 may include one or more processing units (e.g., in a multi-core configuration).

Processor 280 is operatively coupled to a communication interface 290 such that server computer device 275 is capable of communicating with a remote device such as cardholder's computer device 202 or another server computer device 275. For example, communication interface 290 may receive requests from client systems 114 or input device 118 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server computer device 275. For example, server computer device 275 may include one or more hard disk drives as storage device 134. In other embodiments, storage device 134 is external to server computer device 275 and may be accessed by a plurality of server computer devices 275. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory areas 210 and 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
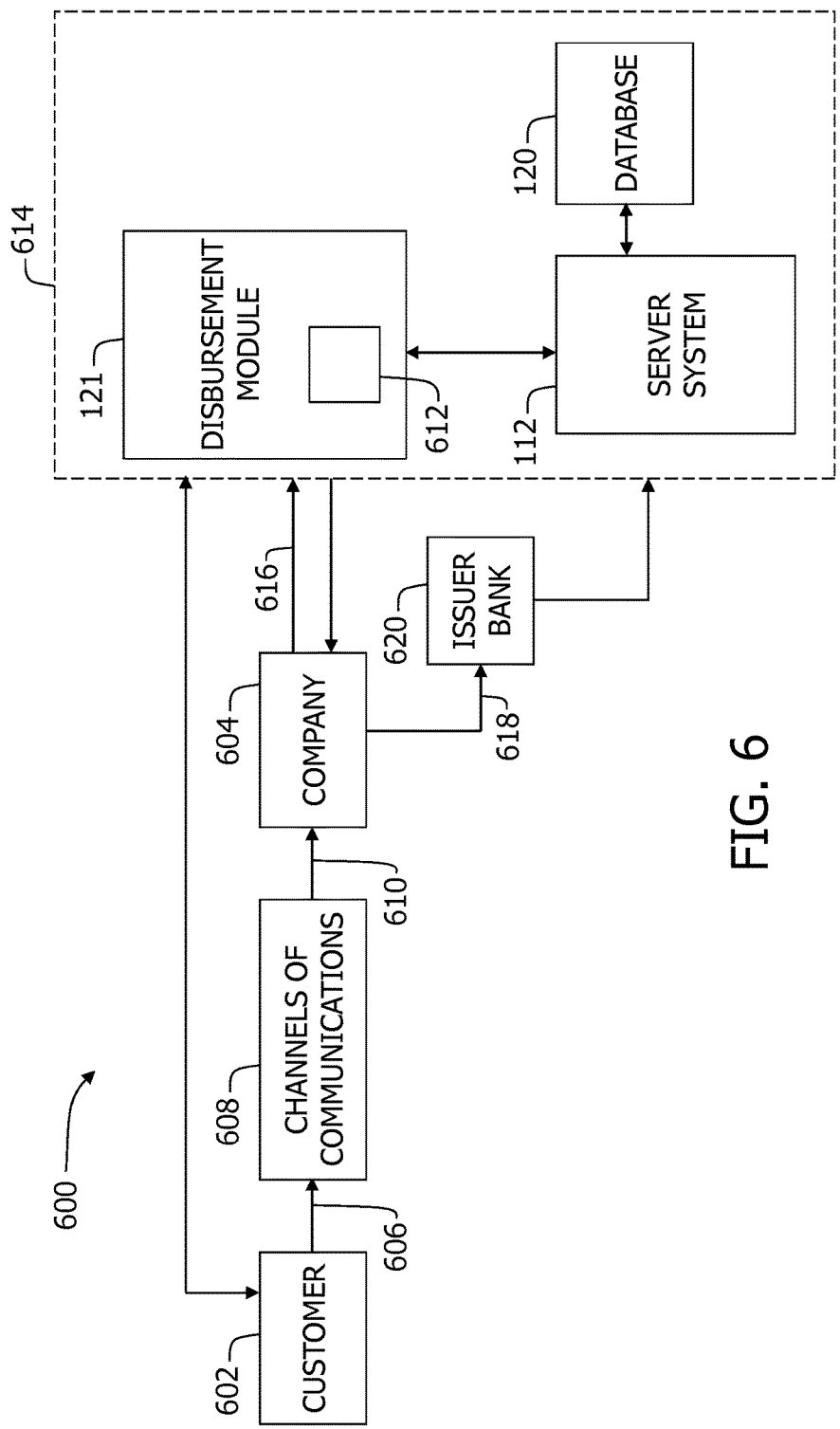

FIG. 6 is a simplified data flow block diagram 600 of a customer registering within a DM payment system 100 (see FIG. 2) to receive a disbursement in accordance with one embodiment of the present invention. Components in diagram 600 that are identical to components of system 100 (shown in FIG. 2) are identified in FIG. 6 using the same reference numerals as used in FIG. 2.

In the example embodiment, a customer 602 interacts with a company 604, such as a business, an insurance company, a governmental entity, or other business entity, that is already registered with DM payment system 100. Specifically, customer 602 may interact 606 with a variety of channels of communication 608. Channels of communication 608 include, but are not limited to, a computer device such as client system 114, a mobile device (e.g., smart phone or computer tablet) such as input device 118, or a telephone.

In the example embodiment, customer 602 accesses 610 a website associated with company 604, the website being displayed on one of communication channels 608. The website displays a link to an electronic wallet application 612 hosted on a payment processing platform 614, which is part of the DM payment system 100. Payment processing platform 614 includes server system 112, database 120 and DM 121. Electronic wallet application 612 interfaces between company 604 and payment processing platform 614. Specifically, electronic wallet application 612 receives and communicates data between a website associated with company 604 and payment processing platform 614.

Customer 602 enters customer registration data 616 into electronic wallet application 612. To enter customer registration data 616, the website associated with company 604 includes a website link that connects customer 602 either to an electronic wallet application 610 website or a mobile wallet application. Customer registration data 616 includes, but is not limited to, customer contact data, a receiving PAN (Primary Account Number) or bank account numbers, and any payment PANs or bank account numbers for the customer. If customer 602 does not have an eligible PAN, customer 602 will be prompted to register for a prepaid card associated with DM payment system 100. Customer registration data 616 is stored within database 120.

After receiving customer registration data 616, company 604 transfers 618 funds to an issuer bank 620. The funds transferred are to be used, at least in part, for completing the disbursement to customer 602. In one embodiment, company 604 also transfers at least a portion of customer registration data 616, namely the receiving PAN of the customer, to issuer bank 620, which in turn is communicated to payment processing platform 614. In an alternate embodiment, DM payment system processes customer registration data.

Figure 7:
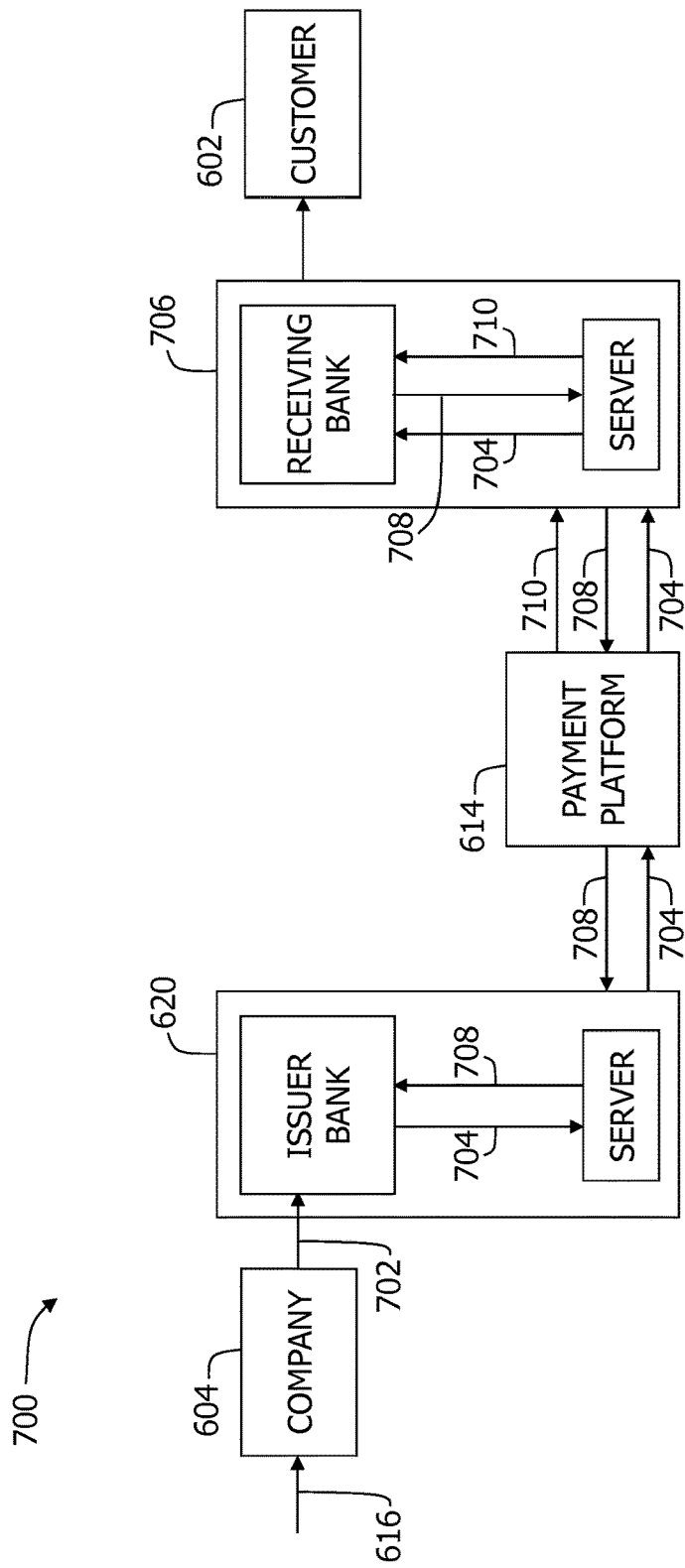

FIG. 7 is a simplified data flow block diagram 700 of a disbursement transaction being processed by a DM payment system 100 (see FIG. 2) in accordance with one embodiment of the present invention. Components in diagram 700 that are identical to components already identified in earlier figures are identified using the same reference numerals previously used.

In the example embodiment, after company 604 receives customer registration data 616 from customer 602 through electronic wallet application 612 and customer 602 provides the necessary payment verification identifier, company 604 initiates 702 the disbursement transaction by instructing issuer bank 620 to disburse the funds to customer 602. In an alternate embodiment, DM payment system 100 instructs issuer bank 620 to disburse the funds to customer 602. In another alternate embodiment, DM payment system 100 may directly submit the payment to customer 602 upon receiving the payment verification identifier.

In the example embodiment, issuer bank 620 transmits an authorization request message 704 (message 0200) to payment processing platform 614, which in turn communicates authorization request message 704 (message 0200) to a receiving bank 706. Receiving bank 706 is associated with and corresponds to the receiving PAN of customer 602. Upon receiving authorization request message 704, receiving bank 706 verifies the existence in good standing of the receiving PAN of customer 602 or, in the case where customer 602 has registered to receive the disbursement via a prepaid card, verifies that receiving bank 706 is capable of issuing the requested prepaid card to customer 602.

After completing the verification process, receiving bank 706 transmits an authorization response message 708 (message 0210) to payment processing platform 614, which in turn communicates authorization response message 708 (message 0210) to issuer bank 620. If receiving bank 706 is able to affirmatively verify that the receiving PAN of customer 602 exists and is in good standing or that a prepaid card can be issued to customer 602, then authorization response message 708 is a confirmation message to complete the disbursement. If, however, receiving bank 706 is not able to affirmatively verify the receiving PAN or that a prepaid card can be issued to customer 602, then authorization response message 708 is a denial message and the disbursement is cancelled and another form of payment is requested.

After receiving a confirming authorization response message 708, payment processing platform 614 transmits a disbursement message 710 to receiving bank 706. Disbursement message 710 includes instructions to transfer funds from issuer bank 620 to receiving bank 706. More specifically, disbursement message 710 includes instructions to transfer funds from a payment account associated with company 604 at issuer bank 620 to a receiving account or prepaid payment card associated with customer 602 at receiving bank 706. Customer 602 has then received the disbursement payment from company 604.

Figure 8:
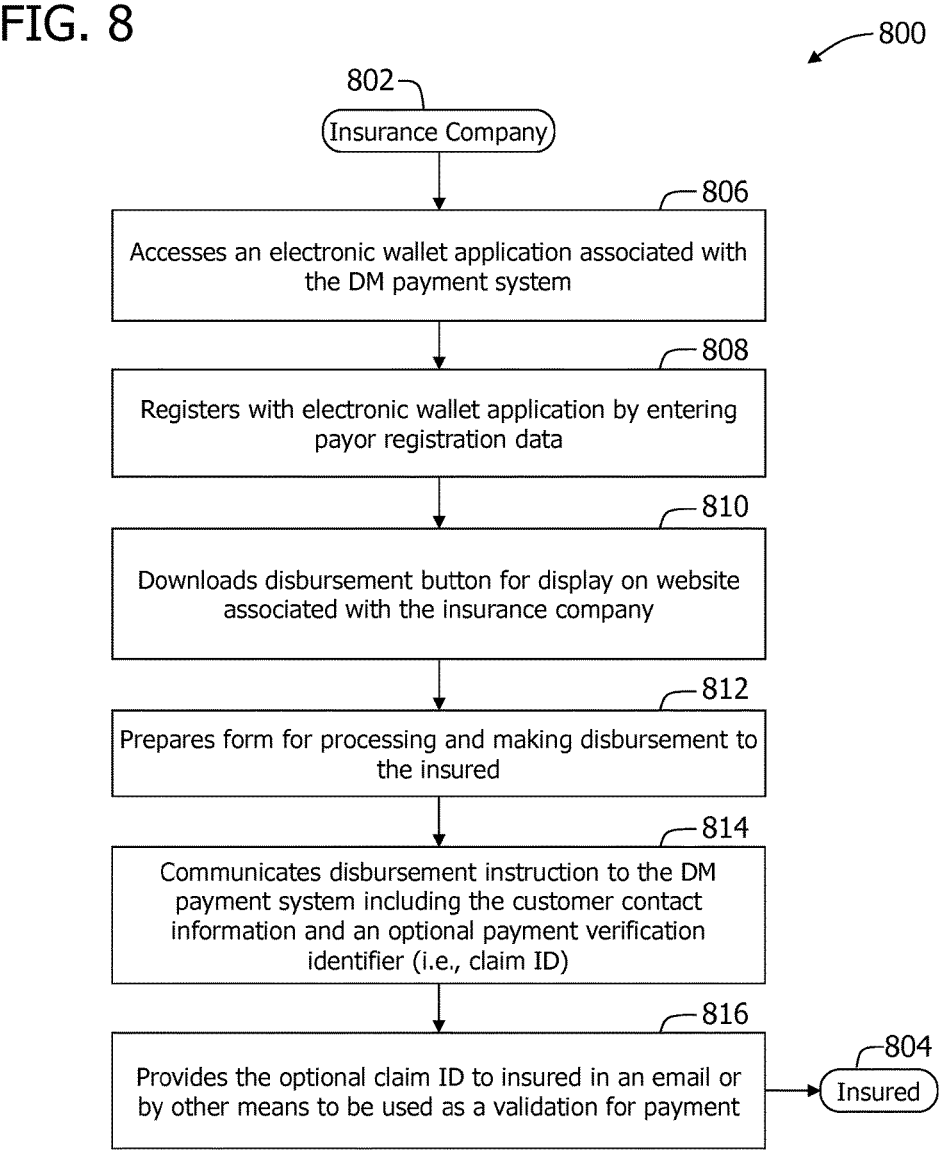

FIG. 8 is a flowchart 800 showing a disbursement transaction being processed by a DM payment system 100 (FIG. 2) from the perspective of a company 802 newly registering for the disbursement service. In the example embodiment, company 802 is an insurance company making a disbursement to an insured 804 for a property loss associated with an insurance policy. However, the invention is not limited to this example. The invention could be used by any business entity making a payment to a person.

In the example embodiment, insurance company 802 accesses 806 a website associated with payment card interchange network 100. Specifically, insurance company 802 access 806 an electronic wallet application hosted by payment card interchange network 100. Insurance company 802 registers 808 with payment card network 100 for the DM service by entering payor registration data. Insurance company 802 then downloads 810 certain computer code from payment card network 100 to a business entity computer device for displaying a disbursement button on a website associated with insurance company 802. As explained below in more detail, the disbursement button is displayed on the insurance company website so that a customer representative may initiate a disbursement to insured 804.

After downloading 810, a customer representative associated with insurance company 802 prepares 812 an internal form for processing and making a disbursement to insured 804. The internal form is displayed on a computer device associated with insurance company 802 and accessible by the customer representative. The customer representative accesses a claim disbursement form online, enters the required information into the disbursement form including capturing the customer (i.e., insured) contact information such as a mobile phone number and/or email address for insured 804, and selects the DM disbursement button displayed on the insurance company website. The customer contact information and an optional payment verification identifier (i.e., claim ID) are then communicated 814 as a disbursement command from insurance company 802 computing system to DM payment system 100 for processing. If a claim ID is generated, the claim ID is provided 816 to insured 804 in an email or by other means to be used as a validation for payment.

In another embodiment, the disbursements can be uploaded as a batch file. In the case of a batch disbursement, a customer representative for the business entity prepares the online internal forms to make the disbursements, and selects the DM disbursement button displayed on the business entity website. At a designated time (i.e., daily, weekly, etc.), the disbursement commands are transmitted, typically in an XML format, to DM payment system 100 for processing. Each disbursement command of the batch disbursement commands contains a contact email or mobile phone number for the customer/payee. In some cases, the disbursement command transmitted to DM payment system 100 also includes a claim ID for customer validation. If there is a claim ID, the claim ID is provided to the customer/payee in an email or by other means (payment verification message) so that it can be used by the customer to validate payment.

It is important to note that at this point insured/customer 804 or payee does not need to be signed up for receiving an electronic disbursement. In other words, representatives for insurance company 802 can prepare 812 the disbursement form online, enter the required information into the disbursement form including capturing the customer (i.e., insured) contact information such as a mobile phone number and/or email address for the customer, and select the DM disbursement button displayed on the insurance company website without insured 804 being registered within system 100 for receiving payment.

Figure 9:
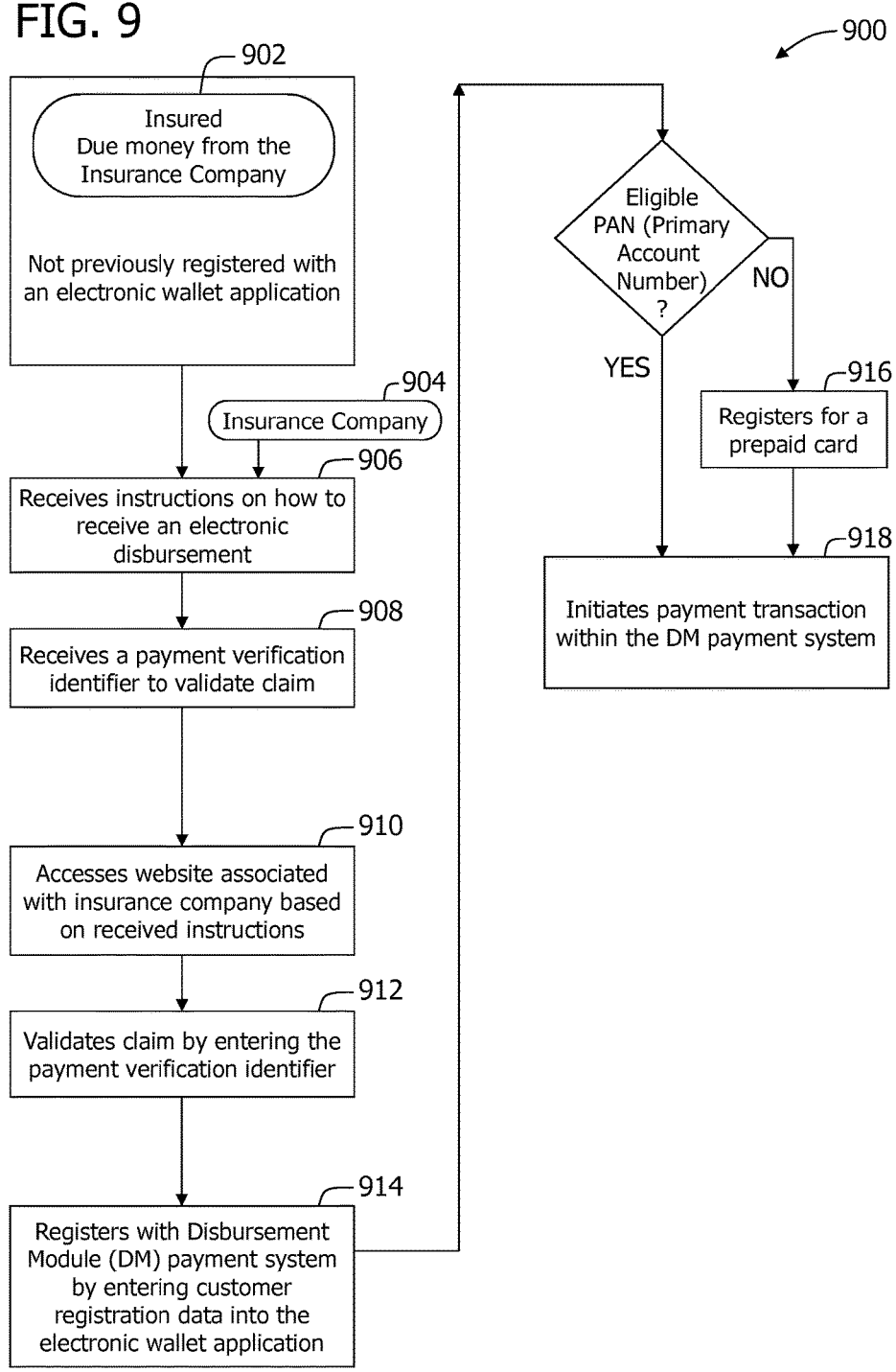

FIG. 9 is a flowchart 900 showing a disbursement transaction being processed by a DM payment system 100 (FIG. 2) from the perspective of an insured 902, who is not previously registered with the electronic wallet application of DM payment system 100 that is displayed on a website associated with insurance company 904. Insured 902 plans to access the electronic wallet application using an insured computer device and a web-based network connection linked to an insurance company computing device hosting the insurance company website.

In the example embodiment, insured 902 is due money from insurance company 904. Insured 902 receives 906 instructions in email or regular mail on how to receive the electronic disbursement from insurance company 904 (i.e., a computer link to click on to access the insurance company website). Insured 902 also receives 908 a payment verification identifier to validate claim and verify that insured 902 is the approved person to receive the disbursement.

Insured 902 then accesses 910 the website associated with insurance company 904 based on received 906 commands. The website associated with insurance company 904 prompts insured 902 to validate 912 the claim by entering the payment verification identifier previously provided to insured 902. Insured is then prompted to register 914 with DM payment system 100 by entering customer registration data into the electronic wallet application. The customer registration data includes a receiving PAN (Primary Account Number) or bank account numbers along with any payment PANs or bank account numbers. If insured 902 does not have an eligible PAN, the insured 902 will be prompted to register 916 for a prepaid card associated with DM payment system 100.

In the example embodiment, upon registration by insured 902, DM payment system 100 initiates 918 payment to insured 902. Because DM payment system 100 initiates payment, the security of payment information associated with insured 902 is improved since it is not transmitted and/or shared among multiple entities. In an alternate embodiment, the wallet application may provide the receiving bank account number entered by insured 902 to insurance company 904 for payment processing. Insurance company 904 may then initiate the payment transaction within DM payment system 100, and insured 902 would receive an electronic payment either by the funds being transferred to the customer receiving bank account number, or being transferred to a prepaid credit card that the customer can use.

Figure 10:
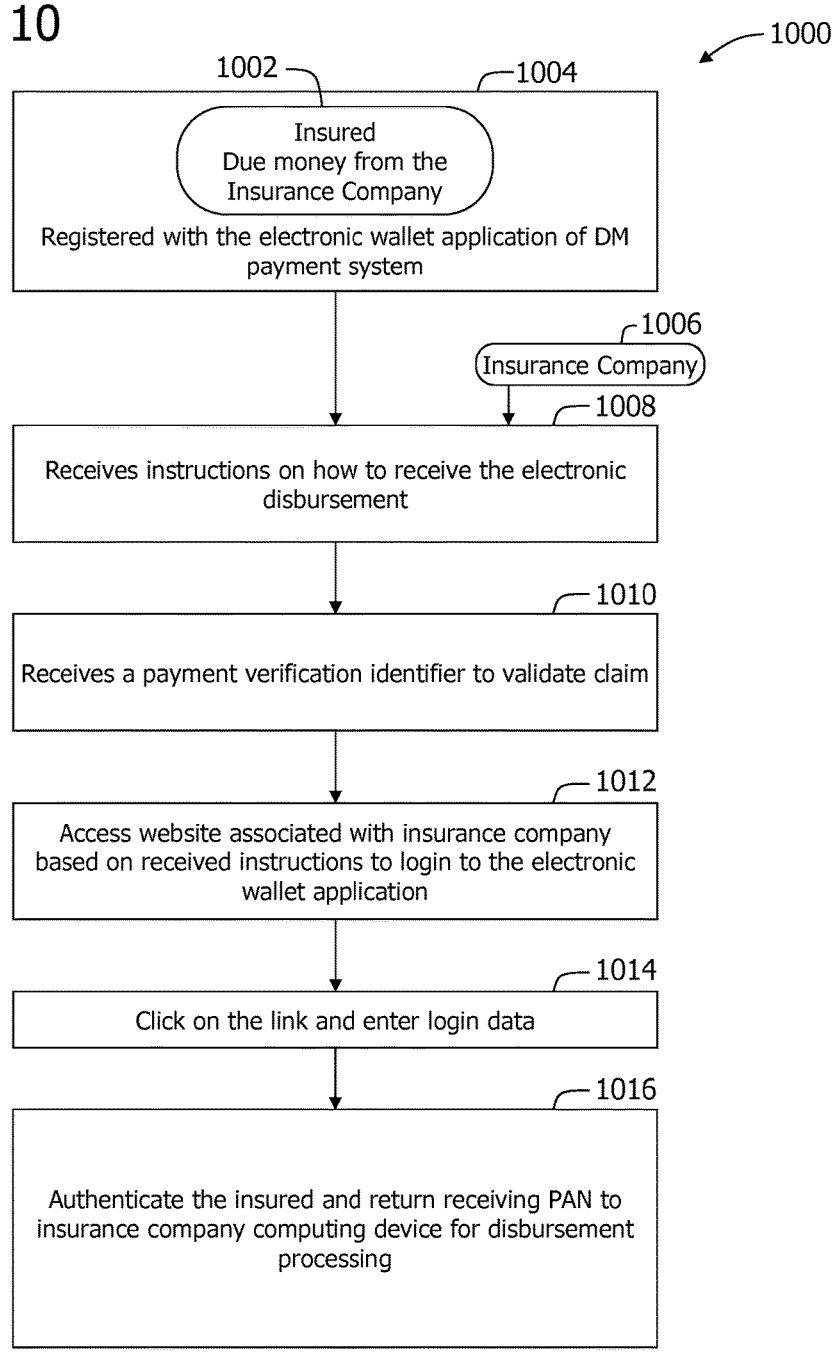

FIG. 10 is a flowchart 1000 showing a disbursement transaction being processed by a DM payment system 100 (FIG. 2) from the perspective of an insured 1002, who is already registered 1004 with the electronic wallet application of DM payment system 100 that is displayed on a website associated with insurance company 1006. Insured 1002 accesses the electronic wallet application using an insured computer device and a web-based network connection linked to an insurance company computing device hosting the insurance company website.

In the example embodiment, insured 1002 is due money from insurance company 1006. Insured 1002 receives 1008 instructions in email or regular mail on how to receive the electronic disbursement from insurance company 1006 (i.e., a computer link to click on to access the insurance company website). Insured 1002 also receives 1010 a payment verification identifier to validate claim and verify that insured 1002 is the approved person to receive the disbursement.

Insured 1002 then accesses 1012 the website associated with insurance company 1006 based on received 1008 instructions. The website associated with insurance company 1006 provides a link for insured 1002 to login to the electronic wallet application of DM payment system 100 so that insured 1002 can receive the payment.

Insured 1002 clicks 1014 on the link and enters login data for insured 1002. The electronic wallet application authenticates 1016 insured 1002 and returns receiving bank account number to insurance company computing device for disbursement processing. Insurance company 1006 processes the payment as described in FIG. 7, and the appropriate funds are transferred to insured 1002. The funds are either transferred to an account associated with the receiving bank account number of insured 1002 or to a prepaid card for use by insured 1002.

Figure 11:
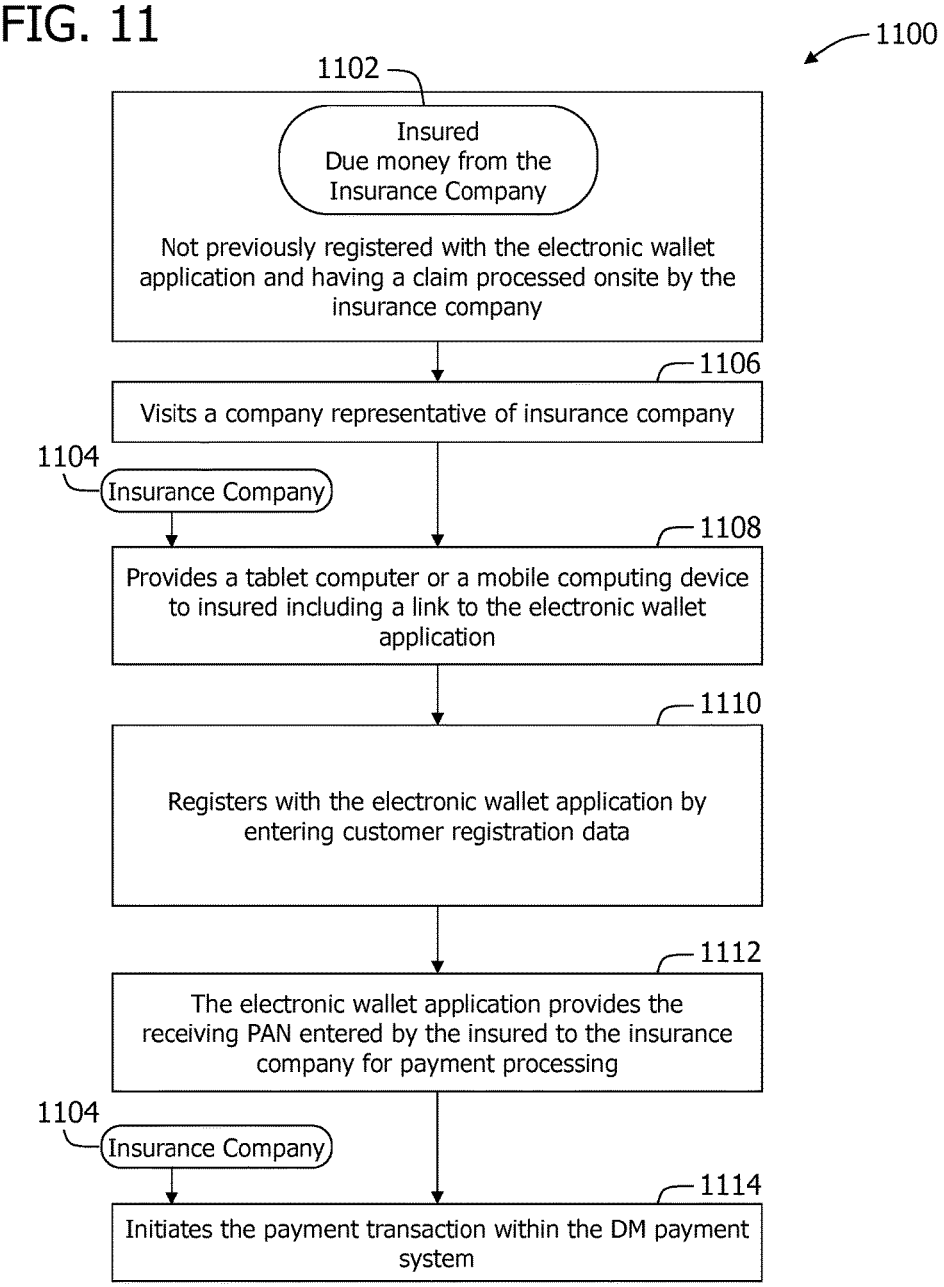

FIG. 11 is a flowchart 1100 showing a disbursement transaction being processed by a DM payment system 100 (FIG. 2) from the perspective of an insured 1102, who is having a claim processed onsite by an insurance company 1104 and who is not previously registered with the electronic wallet application of DM payment system 100.

In the example embodiment, insured 1102 is due money from insurance company 1104. Insured 1102 visits 1106 a company representative of insurance company 1104. Insurance company 1104 provides 1108 a tablet computer or a mobile computing device to insured 1102. The mobile computing device includes an application or link to the electronic wallet application. Insured 1102 registers 1110 with the electronic wallet application by entering customer registration data into the electronic wallet application. The customer registration data includes a receiving PAN (Primary Account Number) or bank account numbers along with any payment PANs or bank account numbers.

In the example embodiment, the wallet application provides 1112 the receiving PAN entered by insured 1102 to insurance company 1104 for payment processing. Insurance company 1104 then initiates 1114 the payment transaction within DM payment system 100, and insured 1102 receives an electronic payment either by the funds being transferred to the customer receiving bank account number or by prepaid payment card.

FIG. 12 is a flowchart 1200 showing a disbursement transaction being processed by a DM payment system 100 (FIG. 2) from the perspective of an insured 1202, who is having a claim processed onsite while meeting with an insurance adjuster associated with an insurance company 1204 and who is not previously registered with the electronic wallet application of DM payment system 100.

In the example embodiment, insured 1202 is due money from insurance company 1204. Insured 1202 visits 1206 a company representative of insurance company 1204. Insurance company 1104 provides 1108 an application on a computer tablet or mobile computing device with a link to the electronic wallet application. Insured 1202 clicks 1210 on the link and registers 1212 with the electronic wallet application by entering customer registration data into the electronic wallet application. The customer registration data includes a receiving PAN (Primary Account Number) or bank account numbers along with any payment PANs or bank account numbers.

In the example embodiment, the wallet application provides 1214 the receiving PAN entered by insured 1202 to insurance company 1204 for payment processing. Insurance company 1204 then initiates 1216 the payment transaction within DM payment system 100, and insured 1202 receives an electronic payment either by the funds being transferred to the customer receiving bank account number or by prepaid payment card.

FIG. 13 is a flowchart 1300 showing a disbursement transaction being processed by a DM payment system 100 (FIG. 2) from the perspective of an insured 1302, who is having a claim processed remotely by an insurance company 1304 and who is not previously registered with the electronic wallet application of DM payment system 100. Insured 1302 is using a mobile computing device and is meeting with an insurance adjuster at the time of the payment.

In the example embodiment, insured 1302 is due money from insurance company 1304. Insurance company 1304 sends 1306 a text or email to insured 1302 mobile device instructing insured 1302 to pick up money. The text or email includes a link to download 1308 the electronic wallet application. Insured 1302 registers 1310 with the electronic wallet application by entering customer registration data into the electronic wallet application. The customer registration data includes a receiving PAN (Primary Account Number) or bank account numbers along with any payment PANs or bank account numbers.

Insured 1302 views 1312 claim disbursement from insurance company 1304 and validates 1314 claim by entering payment verification identifier. In the example embodiment, upon registration by insured 1302, DM payment system 100 initiates 1316 payment to insured 1302. Because DM payment system 100 initiates payment, the security of payment information associated with insured 1302 is improved (i.e., the transaction is more secure) since it is not transmitted and/or shared among multiple entities. In an alternate embodiment, the wallet application may provide the receiving bank account number entered by insured 1302 to insurance company 1304 for payment processing. Insurance company 1304 may then initiate the payment transaction within DM payment system 100, and insured 1302 would receive an electronic payment either by the funds being transferred to the customer receiving bank account number or by prepaid payment card.

FIG. 14 is a flowchart 1400 showing a disbursement transaction being processed by a DM payment system 100 (FIG. 2) from the perspective of an insured 1402, who is having a claim processed remotely by an insurance company 1404 and who is previously registered with the electronic wallet application of DM payment system 100. Insured 1402 is using a mobile computing device and is meeting with an insurance adjuster at the time of the payment.

In the example embodiment, insured 1402 is due money from insurance company 1404. Insurance company 1404 sends 1406 a text or email to insured 1402 mobile device instructing insured 1402 to pick up money. The text or email includes a link to the electronic wallet application. Insured 1402 clicks 1408 on the link and accesses the electronic wallet application using login and passwords. The customer registration data is already saved in the electronic wallet application.

Insured 1402 views 1410 claim disbursement from insurance company 1404 and validates 1412 claim by entering payment verification identifier. The wallet application provides 1414 the receiving bank account number entered by insured 1402 and save in the system to insurance company 1404 for payment processing. Insurance company 1404 then initiates 1416 the payment transaction within DM payment system 100, and insured 1402 receives an electronic payment either by the funds being transferred to the customer receiving bank account number or by prepaid payment card.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 205, 280 including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is verifying by the issuer certain data elements known to the merchant or acquired by the merchant during the transaction. The merchant requests the verification service be performed and supplies the particular data to be verified. The issuer searches its databases in an attempt to verify the data elements requested by the merchant. The issuer indicates whether the issuer was able to find a match, did not find a match, or could not perform the verification by appending an indicator to the response message and returns the indicator and an authorization decision to the merchant. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of verifying certain data elements, selected by a merchant, by a transaction card issuer for payment card transactions, including card-not-present transactions using a network interface processor provides a cost-effective, secure, and reliable means for providing to a an increased level of fraud risk avoidance to merchants using card-present and card-not-present transactions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A disbursement module (DM) computer device for processing an electronic disbursement, said DM computer device comprising:
   a memory device for storing data; and
   a processor in communication with said memory device, said processor programmed to:
   register a payor with a disbursement service provided by said DM computer device using payor registration data received from a payor computer device associated with the payor;
   upload computer code to the payor computer device, the computer code, when executed by the payor computer device, configured to display a graphical control element on an internal website displayed on the payor computer device, wherein the graphical control element includes a disbursement command button;
   receive a disbursement request command from the payor computer device generated by selection of the disbursement command button at the payor computer device, wherein the disbursement request command instructs a disbursement notification message to be sent from said DM computer device to a payee, the disbursement request command including payee contact information, payee verification data, and a disbursement amount to be paid to the payee, and wherein the payee verification data includes a payee identifier;

generate the disbursement notification message including the payee identifier and a payor link configured to direct the payee to a payor website when selected by the payee, the payor website configured to receive disbursement request messages from one or more payees;

automatically transmit the disbursement notification message to a payee computer device associated with the payee;

register, via an electronic wallet application associated with said DM computer device, the payee in response to selection by the payee of an electronic wallet application link displayed on the payor website, by receiving, from the payee computer device, an identification of at least one bank account associated with the payee for receiving the disbursement;

receive a disbursement request message from the payee requesting that the disbursement be made to the payee, the disbursement request message including a candidate payee identifier;

verify the payee by matching the candidate payee identifier to the payee identifier received with the payee verification data; and electronically transfer, in response to the registration and the verification, funds from a bank account associated with the payor to the bank account associated with the payee.

2. A DM computer device in accordance with claim 1, wherein said DM computer device is in communication with a payment card network, wherein the disbursement request command is one of a plurality of disbursement request commands, and wherein said DM computer device is further programmed to:

receive a batch file including the plurality of disbursement request commands;

select the disbursement request command, further comprising identifying payee verification data for the payee from within the batch file; and generating the disbursement notification message including the payee identifier and the payor link.

3. A DM computer device in accordance with claim 1, wherein said DM computer device is further programmed to:

display a disbursement document on a payor computer device;

prompt the payor to input data into the disbursement document; and transmit the disbursement document with the disbursement request command to said DM computer device.

4. A DM computer device in accordance with claim 3, wherein said DM computer device is further programmed to:

automatically transmit a disbursement notification message to the payee upon the payor selecting the disbursement command button, wherein the message is sent to the payee by at least one of email, text message, and push alert.

5. A DM computer device in accordance with claim 1, further programmed to:

prompt the payee to register for a prepaid payment card to receive the funds.

6. A DM computer device in accordance with claim 1, wherein said DM computer device is further programmed to:

request the disbursement funds from an issuing bank associated with the payor;

transmit an authorization request message to a receiving bank associated with the payee, the authorization request message requesting verification of a good-standing payee bank account;

receive an authorization response message from the receiving bank, the authorization response message including one of an affirmation and a denial of the authorization request;

transmit the authorization response message to the issuing bank; and instruct the issuing bank to disburse funds to one of a receiving bank account, a retail location for payee pickup, and a prepaid payment card upon receiving an affirmation authorization response message.

7. A DM computer device in accordance with claim 1, wherein the payor is an insurance provider and the payee is a policyholder of the insurance provider, said DM computer device is further programmed to:

receive the disbursement request command from the insurance provider, the disbursement request command instructing the disbursement notification message to be sent from the disbursement service to the policyholder, the disbursement request command including policyholder contact information, an insurance claim identifier, and the disbursement amount to be paid to the policyholder;

automatically transmit the disbursement notification message to the policyholder in response to the disbursement request command, the disbursement notification message including the insurance claim identifier and the payor link directing the policyholder to an insurance provider website to obtain the disbursement when the payor link is activated by the policyholder;

receive the disbursement request message from the policyholder requesting that the disbursement be made to the policyholder, the disbursement request message including the policyholder identifier; and verify the policyholder by matching the insurance claim identifier received from the policyholder to the insurance claim identifier provided by the insurance provider.

8. A computer-implemented method for processing an electronic disbursement by a disbursement module (DM) computer device, wherein the DM computer device includes a memory device and a processor, said method comprising:

registering a payor with a disbursement service provided by the DM computer device using payor registration data received from a payor computer device associated with the payor;

uploading computer code to the payor computer device, the computer code, when executed by the payor computer device, configured to display a graphical control element on an internal website displayed on the payor computer device, wherein the graphical control element includes a disbursement command button;

receiving a disbursement request command from the payor computer device generated by selection of the disbursement command button at the payor computer device, wherein the disbursement request command instructs a disbursement notification message to be sent from the DM computer device to the payee, wherein the disbursement request command includes payee contact information, payee verification data, and a disbursement amount to be paid to the payee, and wherein the payee verification data includes a payee identifier;

generating the disbursement notification message including the payee identifier and a payor link configured to direct the payee to a payor website when selected by the payee, the payor website configured to receive disbursement request messages from one or more payees;

automatically transmitting the disbursement notification message to a payee computer device associated with the payee;
registering, via an electronic wallet application associated with the DM computer device, the payee in response to selection by the payee of an payor electronic wallet application link displayed on the payor website, by receiving, from the payee, an identification of at least one bank account associated with the payee for receiving the disbursement;
receiving a disbursement request message from the payee requesting that the disbursement be made to the payee, wherein the disbursement request message includes a candidate payee identifier;
matching the candidate payee identifier to the payee identifier received with the payee verification data to verify the payee; and
electronically transferring, in response to the registration and the matching, funds from a bank account associated with the payor to the bank account associated with the payee.

9. A computer-implemented method in accordance with claim 8, further comprising:
automatically transmitting a disbursement notification message to the payee upon the payor selecting the disbursement command button, wherein the message is sent to the payee by at least one of email, text message, and push alert.

10. A computer-implemented method in accordance with claim 8, further comprising:
prompting the payee to register for a prepaid payment card to receive the funds.

11. A computer-implemented method in accordance with claim 8, further comprising:
requesting the disbursement funds from an issuing bank associated with the payor;
transmitting an authorization request message to a receiving bank associated with the payee, the authorization request message requesting verification of a good-standing payee bank account;
receiving an authorization response message from the receiving bank, the authorization response message including one of an affirmation and a denial of the authorization request;
communicating the authorization response message to the issuing bank; and
instructing the issuing bank to disburse funds to one of a receiving bank account, a retail location for payee pickup, and a prepaid payment card upon receiving an affirmation authorization response message.

12. One or more non-transitory computer-readable storage media having computer-executable instructions embodied thereon for processing an electronic disbursement by a disbursement module (DM) computer device, wherein the DM computer device includes a memory device and a processor, wherein when executed by said processor, said computer-executable instructions cause the processor to:
register a payor with a disbursement service provided by said DM computer device using payor registration data received from a payor computer device associated with the payor;
upload computer code to the payor computer device, the computer code, when executed by the payor computer device, configured to display a graphical control element on an internal website displayed on the payor computer device, wherein the graphical control element includes a disbursement command button;
receive a disbursement request command from the payor computer device generated by selection of the disbursement command button at the payor computer device, wherein the disbursement request command instructs a disbursement notification message to be sent from the DM computer device to a payee, the disbursement request command including payee contact information, payee verification data, and a disbursement amount to be paid to the payee, and wherein the payee verification data includes a payee identifier;
generate the disbursement notification message including the payee identifier and a payor link configured to direct the payee to a payor website when selected by the payee, the payor website configured to receive disbursement request messages from one or more payees;
automatically transmit the disbursement notification message to a payee computer device associated with the payee;
register, via an electronic wallet application associated with the DM computer device, the payee in response to selection by the payee of an electronic wallet application link displayed on the payor website, by receiving, from the payee computer device, an identification of at least one bank account associated with the payee for receiving the disbursement;
receive a disbursement request message from the payee requesting that the disbursement be made to the payee, the disbursement request message including a candidate payee identifier;
verify the payee by matching the candidate payee identifier to the payee identifier received with the payee verification data; and
electronically transfer, in response to the registration and the verification, funds from a bank account associated with the payor to the bank account associated with the payee.

13. The one or more non-transitory computer-readable storage media in accordance with claim 12, wherein said computer-executable instructions further cause said processor to:
automatically transmit a disbursement notification message to the payee upon the payor selecting the disbursement command button, wherein the message is sent to the payee by at least one of email, text message, and push alert.

14. The one or more non-transitory computer-readable storage media in accordance with claim 12, wherein said computer-executable instructions further cause said processor to:
request the disbursement funds from an issuing bank associated with the payor;
transmit an authorization request message to a receiving bank associated with the payee, the authorization request message requesting verification of a good-standing payee bank account;
receive an authorization response message from the receiving bank, the authorization response message including one of an affirmation and a denial of the authorization request;
transmit the authorization response message to the issuing bank; and
instruct the issuing bank to disburse funds to one of a receiving bank account, a retail location for payee pickup, and a prepaid payment card upon receiving an affirmation authorization response message.

* * * * *